(12) United States Patent
Yokosuka et al.

(10) Patent No.: US 11,435,774 B2
(45) Date of Patent: Sep. 6, 2022

(54) OPERATION INPUT DEVICE

(71) Applicant: Mitsubishi Electric Corporation, Tokyo (JP)

(72) Inventors: Yusuke Yokosuka, Tokyo (JP); Noriaki Maetani, Tokyo (JP); Yuko Fujikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/963,053

(22) PCT Filed: Jan. 23, 2018

(86) PCT No.: PCT/JP2018/001938
§ 371 (c)(1),
(2) Date: Jul. 17, 2020

(87) PCT Pub. No.: WO2019/145995
PCT Pub. Date: Aug. 1, 2019

(65) Prior Publication Data
US 2020/0341502 A1 Oct. 29, 2020

(51) Int. Cl.
*G05G 5/03* (2008.04)
*G05G 1/02* (2006.01)
*B60K 37/06* (2006.01)
*G05G 1/08* (2006.01)

(52) U.S. Cl.
CPC .............. *G05G 1/02* (2013.01); *B60K 37/06* (2013.01); *G05G 1/08* (2013.01); *G05G 5/03* (2013.01)

(58) Field of Classification Search
CPC ... G05G 5/03; G05G 1/02; G05G 1/08; B60K 37/06
See application file for complete search history.

(56) References Cited

U.S. PATENT DOCUMENTS

2005/0258687 A1 11/2005 Zapf et al.
2014/0338488 A1* 11/2014 Hermansson ......... F16H 59/105
74/473.3

FOREIGN PATENT DOCUMENTS

| JP | 51-6473 U | 1/1976 |
| JP | 56-103135 U | 8/1981 |
| JP | 60-110019 U | 7/1985 |

(Continued)

OTHER PUBLICATIONS

International Search Report issued in PCT/JP2018/001938 (PCT/ISA/210), dated Apr. 24, 2018.

(Continued)

*Primary Examiner* — Robert J Michaud
(74) *Attorney, Agent, or Firm* — Birch, Stewart, Kolasch & Birch, LLP (57) ABSTRACT

To provide an operation input device (100) including an operating knob (11) to be operated by a user; a guide unit (12) having vertices and formed in different directions with respect to each of the vertices being base points, the guide unit (12) indicating an operating area for the operating knob; first sensors (23) each for detecting whether the operating knob (11) is present at a corresponding one of the vertices; and a calculating unit (2) for calculating a set value on the basis of input information received from each of the first sensors (23), by which the user can accurately perform an input operation scale by scale even without looking at the operation input device (100).

6 Claims, 8 Drawing Sheets

(56) References Cited

FOREIGN PATENT DOCUMENTS

| JP | 6-335073 A | 12/1994 | | |
|---|---|---|---|---|
| JP | 2007-137221 A | 6/2007 | | |
| JP | 2011-219002 A | 11/2011 | | |
| JP | 2011219002 A | * 11/2011 | ........... | F16H 59/105 |
| JP | 5166068 B2 | 3/2013 | | |
| WO | WO 2004/027994 A1 | 4/2004 | | |

OTHER PUBLICATIONS

Extended European Search Report, dated Dec. 15, 2020, for European Application No. 18902701.4.
Office Action issued Oct. 6, 2021 in corresponding European Patent Application No. 18 902 701.4.
Office Action dated Jun. 17, 2021 issued in corresponding Chinese Patent Application No. 2018600867113.3 with a Machine Translation.

* cited by examiner

OPERATION INPUT DEVICE

TECHNICAL FIELD

The present invention relates to an operation input device for inputting a set value to an electronic device.

BACKGROUND ART

An input operation of inputting a set value in a determined range such as conventional volume setting of a television set or temperature setting of an air conditioner is also often used by a graphical user interface (GUI) on a physical control panel and a touch panel. Input methods for them include: a method in which two conventional buttons are prepared, and up and down buttons, one of which is assigned a function of increasing the value of a set value and the other is assigned a function of decreasing the value of the set value, are used; and a method of using an operation input device in the form of a wheel, like the input unit being a mouse wheel, an operation input device in the form of a slider bar that slides a bar of the input unit, etc. However, the up and down buttons have problems that a set value that is currently set is not known or a range of set values that can be set overall is not known. In addition, the operation input device in the form of a wheel or in the form of a slider bar, etc., have a problem that a visually impaired person or a worker who operates the operation input device without looking at the operation input device has no idea about where to set the input unit upon an operation of inputting a set value, and thus has difficulty in adjusting a force and has difficulty in performing an input operation scale by scale.

In view of those problems, Patent Literature 1 proposes s slide switch in which sawtooth-like projections and recesses are provided as an internal structure on the left and right sides of a knob which is an input unit, and the knob includes two iron balls and a spring between the iron balls, and when a user moving the knob, the iron balls are in contact with the projection and recess configuration, thereby enabling operation input for changing the value of a set value scale by scale.

CITATION LIST

Patent Literatures

Patent Literature 1: JP S51-006473 U

SUMMARY OF INVENTION

Technical Problem

The slide switch of Patent Literature 1 has a problem that movement is linear and thus when a user performs operation input by applying a force, it is difficult to adjust how many sawtooth-like projections and recesses are passed along with movement, and it is difficult to change the value of a set value scale by scale. Due to the above-described problem, it is difficult for a visually impaired person or a worker who operates the operation input device without looking at the operation input device to operate the operation input device.

The present invention is made to solve a problem such as that described above, and an object of the present invention is to implement an operation input device that enables a visually impaired person or a worker who operates the operation input device without looking at the operation input device to accurately perform an input operation on the operation input device scale by scale even without looking at the operation input device.

Solution to Problem

To solve the above-described problem and attain the object, an operation input device of the present invention includes: an operating knob to be operated by a user; a guide unit having vertices and formed in different directions with respect to each of the vertices being base points, the guide unit indicating an operating area for the operating knob; first sensors each to detect whether the operating knob is present at a corresponding one of vertices; processing circuitry to calculate a set value on the basis of input information received from each of the first sensors; and a main body unit (13) having a shape corresponding to a shape of the guide unit, and having, on sides of the main body, edges at locations corresponding to the vertices of the guide unit.

Advantageous Effects of Invention

The operation input device according to the present invention has the above-described configuration, and thus, a visually impaired person or a worker who operates the operation input device without looking at the operation input device can accurately perform an input operation on the operation input device scale by scale even without looking at the operation input device.

DESCRIPTION OF EMBODIMENTS

Embodiments of operation input devices according to the present invention will be described in detail below on the basis of the drawings. In the drawings referred to below, the same or corresponding portions are given the same reference signs. Note that the invention is not limited to the embodiments. Note also that although in the following description only a case in which an operation input device is a single unit is described, it is not limited to the case of a single unit, and the operation input device may be incorporated into an operation target product, e.g., an electronic device such as a television set or an air conditioner, or an operating device such as a remote control for operating the operation target product.

First Embodiment

Figure 1:
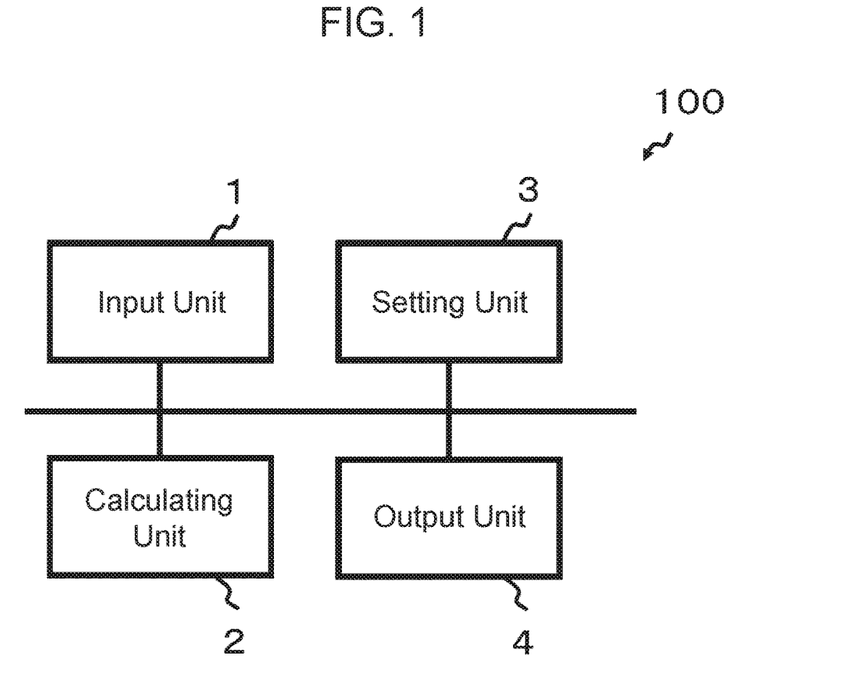
FIG. 1 is a configuration diagram showing an example of an operation input device of a first embodiment of the present invention.

FIG. 1 is a configuration diagram showing an example of an operation input device of a first embodiment of the present invention. As shown in FIG. 1, an operation input device 100 includes an input unit 1, a calculating unit 2, a setting unit 3, an output unit 4, and a power supply (not shown) serving as a power source for each unit.

The input unit 1 is a device to which a user inputs a set value, and transmits input information about the set value inputted by the user to the calculating unit 2. The details of the input unit 1 will be described later.

The calculating unit 2 calculates a set value of an operation target on the basis of the input information received from the input unit 1, and transmits a calculation result which is a result of the calculation to the setting unit 3 and the output unit 4. Here, the calculating unit 2 also performs a process of converting the calculation result into a format in which the setting unit 3 and the output unit 4 can process. The calculating unit 2 may be a processor such as a central processing unit (CPU), or a single integrated circuit such as a field programmable gate array (FPGA) or a large scale integration (LSI), or a combination thereof. Note that in a case of implementing the calculating unit 2 by a processor, etc., and implementing a calculation process by software or firmware, the calculating unit 2 includes a memory which is not shown, and stores a program for the process in the memory. Note also that in the following description it is assumed that the calculating unit 2 is a processor including a memory, and in the memory there are stored a set value that is currently set, a correspondence table showing a correspondence relationship between input information and a set value, and format information of data that can be processed by the setting unit 3 and the output unit 4.

The setting unit 3 notifies the operation target of the calculation result received from the calculating unit 2. The setting unit 3 is, for example, an infrared LED or a wireless module for wireless communication. Note that when the operation input device 100 is physically connected to an operation target product, the operation input device 100 may be configured in such a manner that the operation input device 100 does not include the setting unit 3, and the calculating unit 2 directly notifies the operation target of a calculation result. In addition, the setting unit 3 may be configured to only output a calculation result to the outside. In this case, a process of notifying the operation target of a set value may be performed by the user. Here, the process of notifying the operation target of a set value which is performed by the user refers to, for example, the operation of the user directing the setting unit 3 in a direction of the operation target when the setting unit 3 is an infrared LED.

The output unit 4 outputs the calculation result received from the calculating unit 2 to the user by audio or an image. The output unit 4 is, for example, a speaker, etc., in a case of audio output, and a monitor, etc., in a case of image output.

Note that although an embodiment in which the operation input device 100 includes the calculating unit 2, the setting unit 3, and the output unit 4 is described, when the operation input device 100 is incorporated into another device, such as an operation target product or an operating device for operating the operation target product, the operation input device 100 may be structured in such a manner that the operation input device 100 does not include the calculating unit 2, the setting unit 3, and the output unit 4, and share them with the incorporated device.

Next, the details of the input unit 1 will be described.

Figure 2:
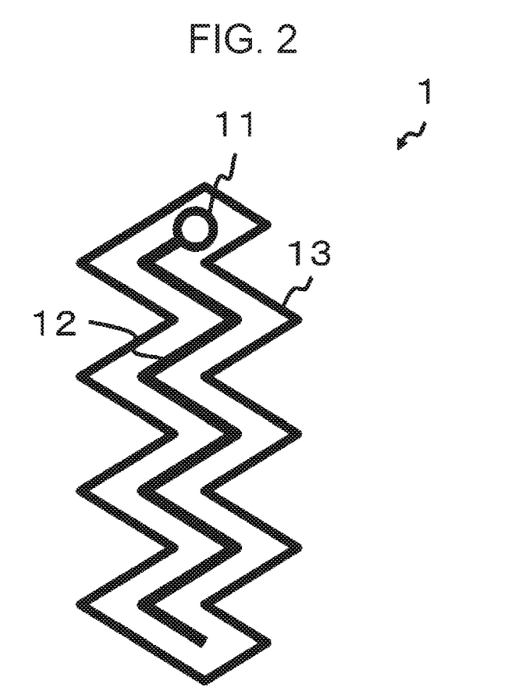
FIG. 2 is a front view showing an example of an input unit of the operation input device of the first embodiment of the present invention.
Figure 3:
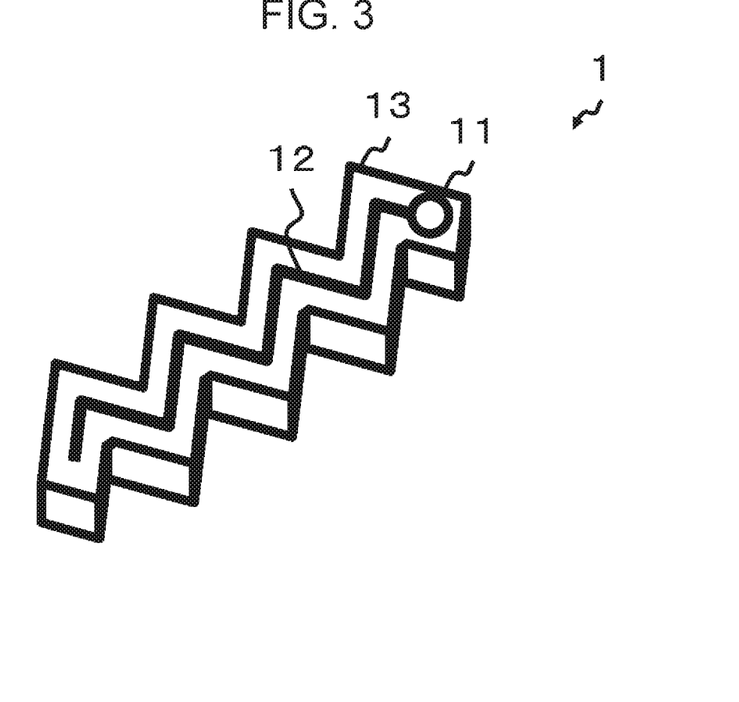
FIG. 3 is a perspective view showing an example of the input unit of the operation input device of the first embodiment of the present invention.

FIG. 2 is a front view showing an example of the input unit of the operation input device of the first embodiment of the present invention, and FIG. 3 is a perspective view showing an example of the input unit of the operation input device of the first embodiment of the present invention. As shown in FIGS. 2 and 3, the input unit 1 includes an operating knob 11 operated by the user; a guide unit 12 indicating an operating area of the operating knob 11; and a main body unit 13 forming an exterior.

Figure 4:
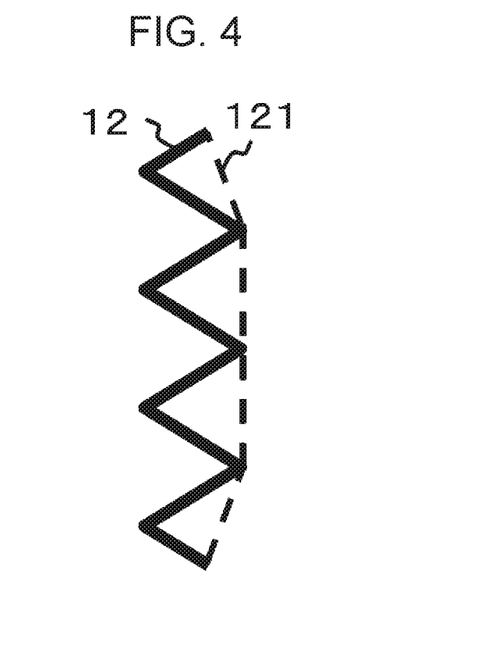
FIG. 4 is an explanatory diagram showing an example of a guide unit of the operation input device of the first embodiment of the present invention.

The guide unit 12 is a cut made in a surface of the main body unit 13, and the user operates the operating knob 11 along the guide unit 12. FIG. 4 is an explanatory diagram showing an example of the guide unit of the operation input device of the first embodiment of the present invention. Here, an auxiliary line 121 of FIG. 4 is an auxiliary line for describing the guide unit 12. It can be clarified that, by drawing the auxiliary line 121, the guide unit 12 has nine vertices alternately arranged from side to side, and has a sawtooth-like shape in which triangles each connecting adjacent vertices are continuously arranged, and is formed in different directions with respect to each of the vertices being base points. By this, in a case that the user operates the operating knob 11 along the guide unit 12, when a force is applied in the same direction, then the operating knob 11 temporarily stops at a vertex of the guide unit 12, and in order to move the operating knob 11 forward from the vertex of the guide unit 12, the direction of a force applied to the operating knob 11 needs to be changed. In addition, the number of vertices of the guide unit 12 matches the number of set values that can be set. By this, the user can easily recognize a set value having been set, by checking the number of times that the operating knob 11 has stopped during the operation of the operating knob 11, and can accurately perform an input operation scale by scale. Note that it is preferred that the angle of each vertex of the guide unit 12 be acute. When the angle of each vertex of the guide unit 12 is acute, the guide unit 12 can be formed in a space-saving manner, thereby obtaining an advantageous effect of being able to miniaturize the operation input device 100.

The main body unit 13 has a sawtooth-like shape corresponding to the shape of the guide unit 12, and has, on its sides, edges at locations corresponding to the vertices of the guide unit 12. By this, the number of edges on one side of the main body unit 13 matches the number of set values that can be set, and the user can check the number of edges of the main body unit 13 through the sense of touch by touching the main body unit 13 with a hand, and thus can easily grasp a range of set values that can be set. By this, even a visually impaired person or a worker who operates the operation input device 100 without looking at the operation input device 100 can easily grasp a settable range. Here, the sawtooth-like shape corresponding to the shape of the guide unit 12 is not limited to the side shape of the main body unit 13 matching the guide unit 12, and is a shape also including a shape that imitates the guide unit 12, e.g., a shape in which the edges on the sides of the main body unit 13 are formed around the corresponding vertices of the guide unit 12, and a slope of a side connecting edges on a side of the main body unit 13 differs from a slope of a side connecting vertices of the guide unit 12. In addition, the locations, on the sides of the main body unit 13, corresponding to the vertices of the guide unit 12 may be any location as long as the user can recognize the locations of the vertices of the guide unit 12 when touching the main body unit 13, and the locations are around the vertices of the guide unit 12.

Figure 5:
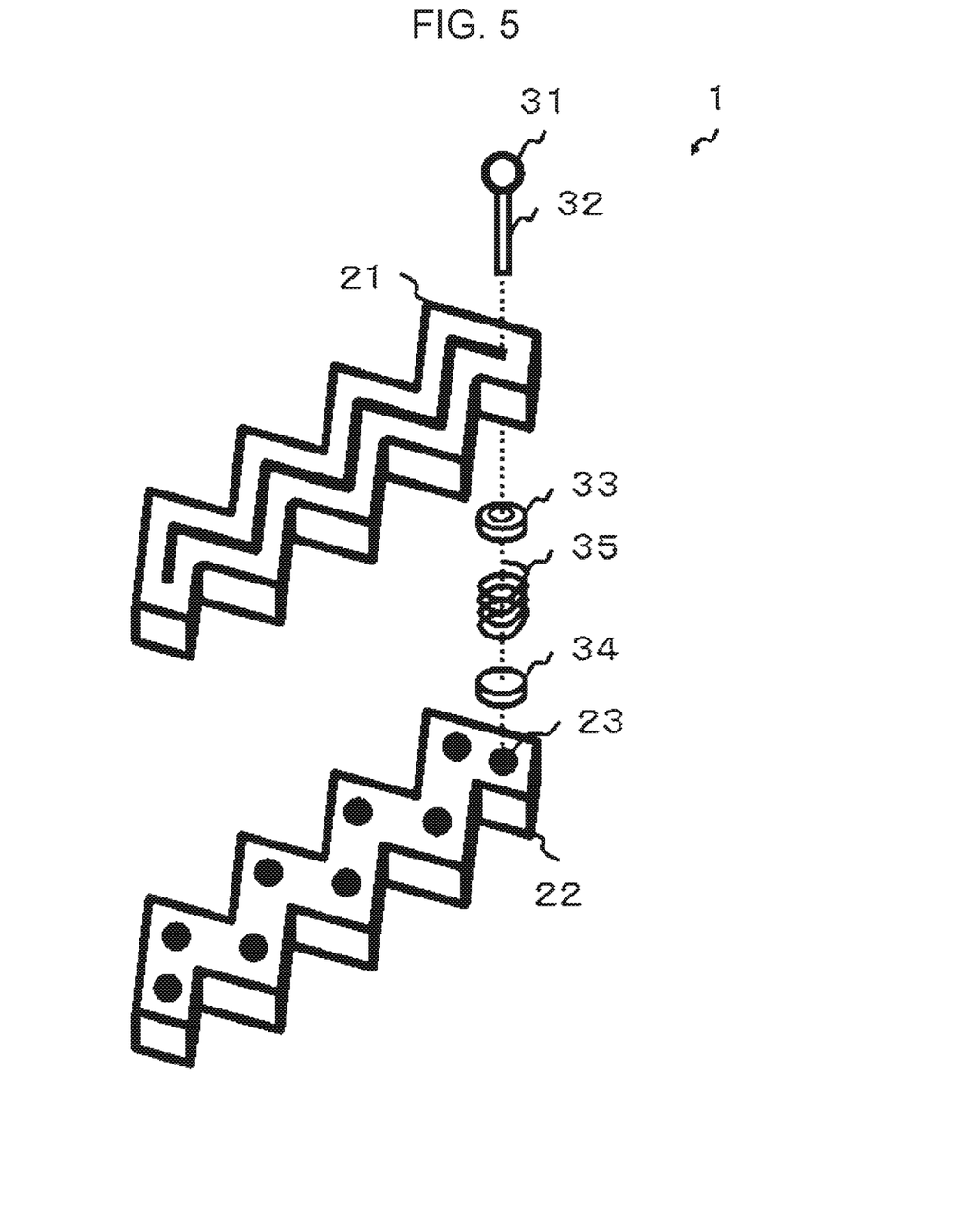
FIG. 5 is an exploded perspective view showing an example of the input unit of the operation input device of the first embodiment of the present invention.
Figure 6:
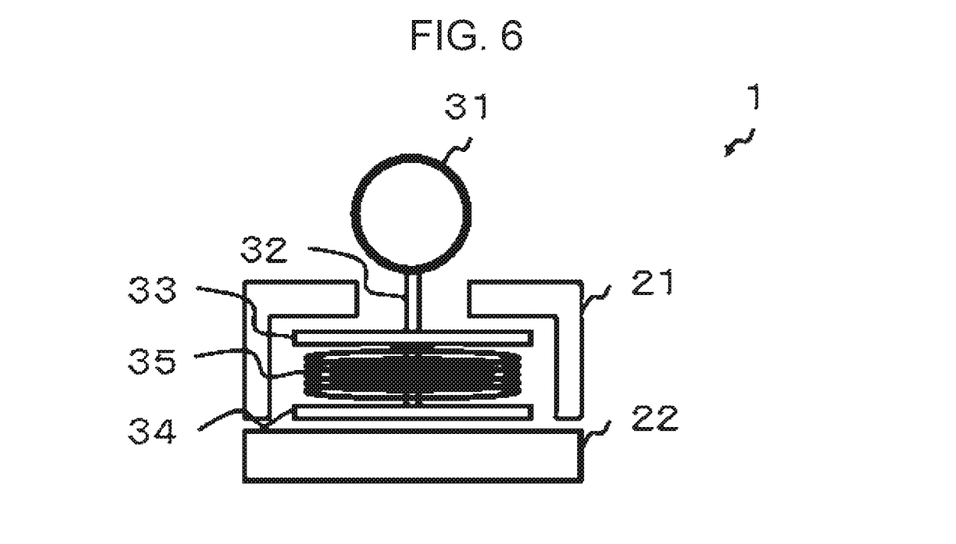
FIG. 6 is a cross-sectional view showing an example of the input unit of the operation input device of the first embodiment of the present invention.

Next, an internal structure of the input unit 1 will be described. FIG. 5 is an exploded perspective view showing an example of the input unit of the operation input device of the first embodiment of the present invention, and FIG. 6 is a cross-sectional view showing an example of the input unit of the operation input device of the first embodiment of the present invention. Here, FIG. 5 is an exploded perspective view of the input unit 1 as viewed from obliquely above, and FIG. 6 is a cross-sectional view of the input unit 1 cut on a plane including the operating knob 11.

As shown in FIGS. 5 and 6, the input unit 1 includes an upper main body unit 21, a lower main body unit 22, sensors 23, a holding unit 31, a support unit 32, a disc 33, a disc 34, and a spring 35. As shown in FIG. 5, the main body unit 13 includes two members, the upper main body unit 21 and the lower main body unit 22. The upper main body unit 21 has a structure in which the guide unit 12 is formed at a central portion of a top of the upper main body unit 21, and the upper main body unit 21 has a hollow made therein by their top and sides. The lower main body unit 22 has a structure in which the sensors 23 are arranged at locations corresponding to the vertices of the guide unit 12 formed on the upper main body unit 21. In addition, a top surface of the lower main body unit 22 may be coated with a solid lubricant such as molybdenum disulfide, graphite, or fluorocarbon resin in order to reduce friction on the top of the lower main body unit 22. Here, by reducing friction on the top surface of the lower main body unit 22, an advantageous effect of facilitating movement of the operating knob 11 by the user can be obtained. Note that the lower main body unit 22 may have a structure in which the calculating unit 2, the setting unit 3, and the output unit 4 which are not shown are stored in the lower main body unit 22. Note that the upper main body unit 21 and the lower main body unit 22 are members made of a general material such as wood, metal, or synthetic resin such as plastic.

The sensors 23 are pressure sensors that are arranged, on the lower main body unit 22, at locations corresponding to the vertices of the guide unit 12 formed on the upper main body unit 21, and each sensor 23 converts pressure applied thereto into current, and generates input information on the basis of a current value into which the pressure applied to the sensor when the operating knob 11 is present on the sensor 23 is converted, and transmits the input information to the calculating unit 2. Here, the calculating unit 2 calculates a set value inputted by the user, on the basis of the received input information. The details of a process performed by the sensors 23 and a process performed by the calculating unit 2 will be described later.

As shown in FIG. 5, the operating knob 11 is a knob shaped like a match, and includes the ball-shaped holding unit 31 which is grasped by the user, the rod-like support unit 32, the disc 33, the disc 34, and the spring 35. The holding unit 31 has an insertion opening which is not shown, and by inserting the support unit 32 into the insertion opening, the holding unit 31 and the support unit 32 are formed as an integral member. The disc 33 has a structure in which the disc 33 has a pass-through hole at the center thereof and the support unit 32 is inserted into the pass-through hole, and the disc 33 is movable up and down. The disc 34 has a structure in which the disc 34 has an insertion opening which is not shown, and the support unit 32 is inserted into the insertion opening. In addition, an underside surface of the disc 34 may be coated with a solid lubricant such as molybdenum disulfide, graphite, or fluorocarbon resin so as to reduce friction. Here, by reducing friction on the underside surface of the disc 34, an advantageous effect of facilitating movement of the operating knob 11 by the user can be obtained. The spring 35 has a structure in which the spring 35 is disposed to be sandwiched between the disc 33 and the disc 34 and the support unit 32 is inserted into a central portion of the spring 35, and the spring 35 is stretched and compressed between the upper main body unit 21 and the lower main body unit 22. The disc 33 is movable up and down by the stretch and compression of the spring 35, and when the spring 35 is stretched and the disc 33 is pressed against the upper main body unit 21, the operating knob 11 is fixed at a current location, and when the spring 35 is compressed and the disc 33 moves away from the upper main body unit 21, it becomes possible for the operating knob 11 to move from the current location. Note that the ball-shaped holding unit 31, the rod-like support unit 32, the disc 33, the disc 34, and the spring 35 are members made of a general material such as wood, metal, or synthetic resin such as plastic.

Figure 7:
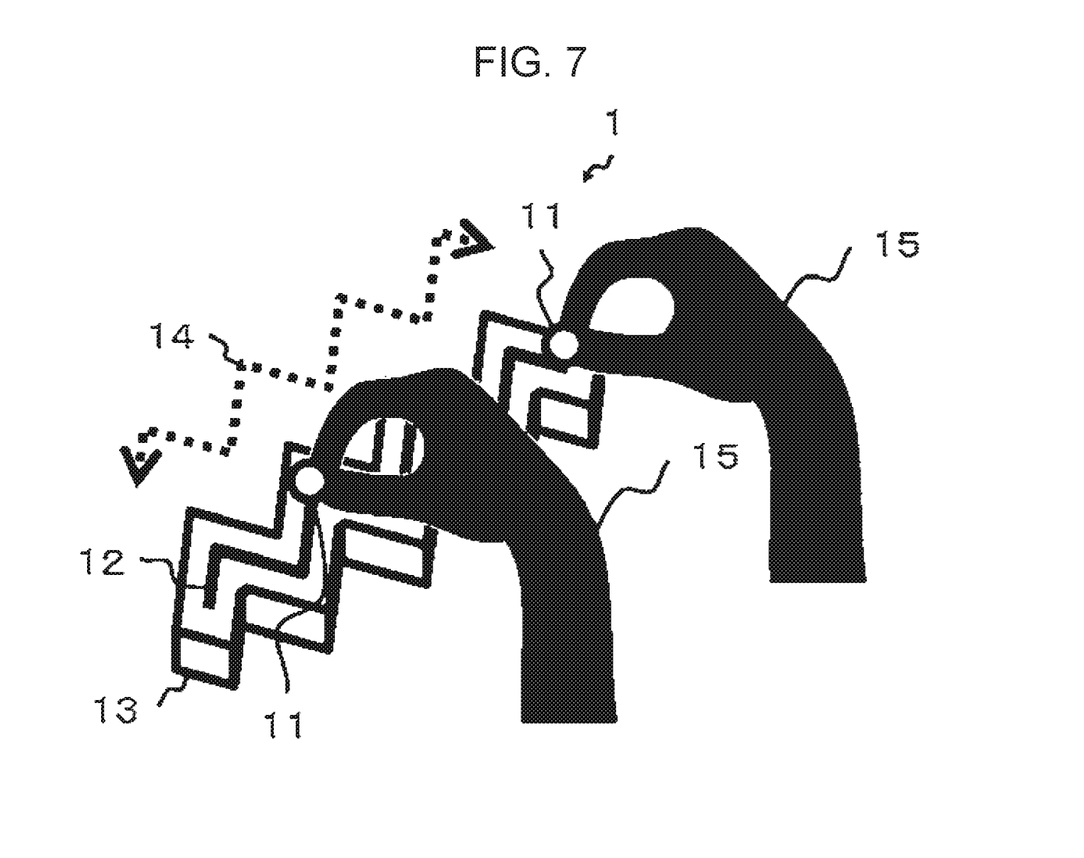
FIG. 7 is an explanatory diagram showing an example of a method of use of the operation input device of the first embodiment of the present invention.

Next, a method of use of the operation input device 100 will be described using FIG. 7. FIG. 7 is an explanatory diagram showing an example of a method of use of the operation input device of the first embodiment of the invention of the present application. Here, a dotted-line arrow 14 of FIG. 7 indicates a path of a user's operation on the operating knob 11, and a hand 15 indicates a user's hand used by the user to operate the operating knob 11. As shown in FIG. 7, it is preferred that in the operation input device 100 the vertical width of the main body unit 13 be just the right size to hold with the hand 15, and the horizontal width of the main body unit 13 be just the right size to hold with both hands. This is because it is preferred that the operation input device 100 have a size that the user cannot operate the operating knob 11 only by a small movement of a fingertip, i.e., the user needs to move his/her hand to operate the operating knob 11, and that the edges of the main body unit 13 each have a size on the order of several centimeters. By such a size, the user can easily recognize an operation direction of the operating knob 11 and can easily carry the operation input device 100.

In addition, the user inputs a set value by moving the operating knob 11 in a zigzag manner as indicated by the dotted-line arrow 14. Here, since the guide unit 12 is formed in different directions with respect to each of the vertices being base points, when the user moves the operating knob 11 from one vertex to the next vertex of the guide unit 12, the user needs to change the direction of a force applied to the operating knob 11. Therefore, unlike a linear operation of the conventional operation input device, in the operation input device 100 of the first embodiment of the invention of the present application, the user needs to change the direction of a force applied to the operating knob 11 every time the user changes, scale by scale, a set value to be inputted, and even a user, such as a visually impaired person or a worker, who pays attention to an operation target and operates the operation input device 100 without looking at the operation input device 100 can surely input a set value scale by scale. In addition, the user can tactilely check the number of edges by touching the edges of the main body unit 13 with the hand 15, and can easily recognize the number of set values that can be inputted.

Note that although a case is described in which, for the size of the main body unit 13, the vertical width is just the right size to hold with the hand 15, and the horizontal width is just the right size to hold with both hands, the size of the main body unit 13 is not limited to just the right size to hold the main body unit 13 with hands, and even when the main body unit 13 is so large that the user cannot hold with his/her hands or so small that the user can easily hold with his/her hands, as long as the user can recognize that the direction of a force applied to the operating knob 11 has been changed upon moving the operating knob 11 from one vertex to the next vertex of the guide unit 12 along the guide unit 12, any size can be adopted.

Figure 8:
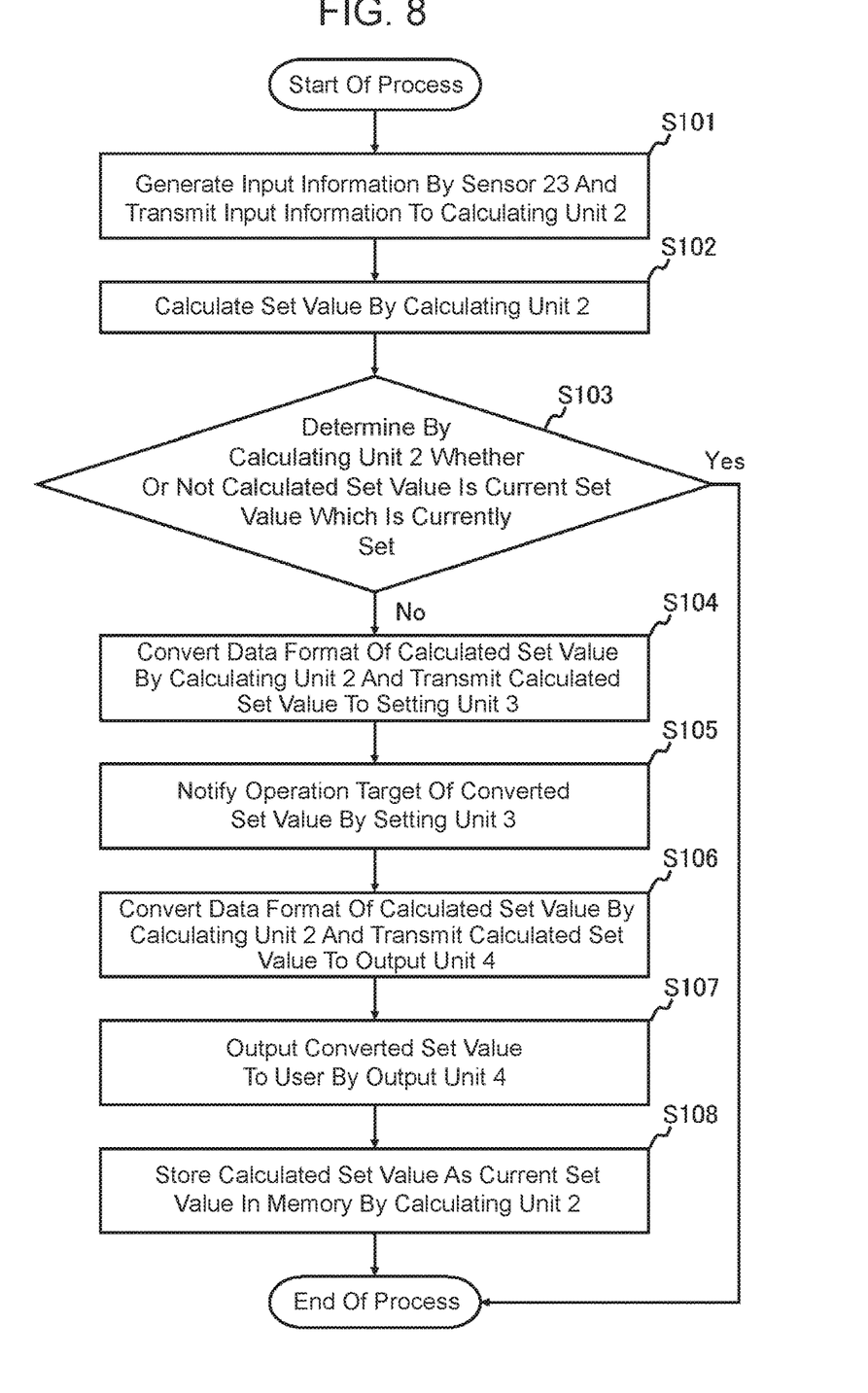
FIG. 8 is a flowchart showing an example of the flow of a process performed by the operation input device of the first embodiment of the present invention.

Next, the flow of an operation input process performed by the operation input device 100 will be described using FIG. 8. FIG. 8 is a flowchart showing an example of the flow of a process performed by the operation input device of the first embodiment of the present invention.

First, by a sensor 23 detecting that there is a change in pressure applied thereto, the processing starts. Specifically, a sensor 23 detects that there is a change in current value into which pressure applied to the sensor is converted, and thereby detects that there is a change in the applied pressure.

At step S101, the sensor 23 generates input information and transmits the input information to the calculating unit 2. Specifically, the sensor 23 generates input information on the basis of a current value into which pressure changed along with movement of the operating knob 11 is converted, and transmits the input information to the calculating unit 2. Here, for the sake of description, the input information is the current value itself. Here, the sensors 23 have different conversion ratios which are used when the sensors 23 convert pressure into current values, and even though the same pressure is applied, the pressure is converted into a different current value for each sensor 23. Hence, the sensors 23 can be distinguished from each other by the converted current values. Note that since pressure applied to the sensor 23 changes depending on the method of operating the operating knob 11 by the user, a current value obtained by conversion by the sensor 23 is not always constant. Hence, it is effective to set some margin for threshold values for the current values by which the respective sensors 23 are distinguished from each other.

Then, at step S102, the calculating unit 2 calculates a set value. Specifically, in the memory of the calculating unit 2 there is stored a correspondence table that associates the current values of the sensors 23 which are input information with set values, and the calculating unit 2 calculates a calculated set value from the input information received from the sensor 23, here, the current value of the sensor 23, and the correspondence table.

At step S103, the calculating unit 2 determines whether or not the calculated set value is a current set value which is currently set, and if the calculated set value is not the current set value (No), processing transitions to step S104, and if the calculated set value is the current set value (Yes), processing ends. Specifically, the calculating unit 2 compares the calculated set value having been calculated with the current set value stored in the memory, and thereby determines whether or not the calculated set value is the current set value. Here, a reason that the processing ends when the calculated set value is the current set value is that when the user starts an operation on the operating knob 11 along the guide unit 12, too, a sensor 23 detects a change in pressure applied to the sensor, and transmits input information to the calculating unit 2, and at this point in time, a set value to be set next by the user is unknown and thus the processing cannot be performed.

At step S104, the calculating unit 2 converts the data format of the calculated set value and transmits the calculated set value to the setting unit 3. Specifically, when the setting unit 3 is an infrared LED, in the memory of the calculating unit 2 there are stored a conversion table for an infrared communication format and a conversion program, and the calculating unit 2 converts the calculated set value into a set value in infrared communication format which is a data format in which the setting unit 3 can process, using the conversion table and the conversion program, and transmits the converted set value having been converted to the setting unit 3.

At step S105, the setting unit 3 notifies an operation target of the converted set value.

Then, at step S106, the calculating unit 2 converts the data format of the calculated set value and transmits the calculated set value to the output unit 4. Specifically, when the output unit 4 is a speaker, in the memory of the calculating unit 2 there are stored an audio format conversion table for the speaker and a conversion program, and the calculating unit 2 converts the calculated set value into audio information which is a data format in which the output unit 4 can process, using the conversion table and the conversion program, and transmits the converted audio information to the output unit 4.

At step S107, the output unit 4 outputs the converted set value to the user. For example, when the output unit 4 is a speaker, the audio information is outputted as sound from the speaker. By this process, when the set value has been changed, the user can easily recognize the changed set value.

Then, at step S108, the calculating unit 2 stores the calculated set value as the current set value in the memory, and ends the processing thereafter. By this process, the calculating unit 2 can update the current set value to be used at step S103.

As described above, according to the operation input device 100 of the first embodiment, a visually impaired person or a worker who operates the operation input device 100 without looking at the operation input device 100 can accurately perform an input operation on the operation input device 100 scale by scale even without looking at the operation input device 100.

In addition, according to the operation input device 100 of the first embodiment, a visually impaired person or a worker who operates the operation input device 100 without looking at the operation input device 100 can check the number of edges of the main body unit 13 by the sense of touch by touching the main body unit 13 with a hand, and thus can easily grasp a range of set values that can be set.

Figure 9:
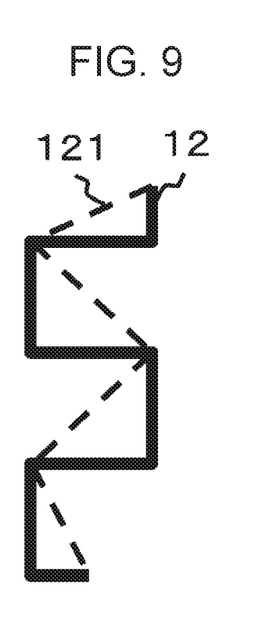
FIG. 9 is an explanatory diagram showing an example of a shape other than a sawtooth-like shape of the guide unit of the operation input device of the first embodiment of the present invention.

Note that although a case is described in which the guide unit 12 has a sawtooth-like shape in which triangles each connecting adjacent vertices are alternately and continuously arranged, the shape is not limited to the sawtooth-like shape in which triangles each connecting adjacent vertices are alternately and continuously arranged, and shapes other than the sawtooth-like shape in which triangles each connecting adjacent vertices are alternately and continuously arranged, e.g., a shape in which polygons each having four or more vertices are formed, may be used. FIG. 9 is an explanatory diagram showing an example of a shape other than the sawtooth-like shape of the guide unit of the operation input device of the first embodiment of the present invention. As shown in FIG. 9, a guide unit 12 has a shape in which triangles each connecting adjacent vertices are alternately and continuously arranged, forming quadrangles. As such, when the guide unit 12 has a shape in which triangles each connecting adjacent vertices are alternately and continuously arranged, forming polygons each having four or more vertices such as quadrangles, compared to a case in which the guide unit 12 has a sawtooth-like shape in which triangles each connecting adjacent vertices are alternately and continuously arranged, the guide unit 12 can be formed in a space-saving manner, thereby enabling an advantageous effect of being able to miniaturize the operation input device 100 to be obtained. In addition, in this case, the number of vertices of the guide unit 12 is set to match the number of set values that can be set, and the main body unit 13 has a shape having edges corresponding to the vertices of the guide unit 12. By this, the user can check the number of edges of the main body unit 13 by the sense of touch by touching the edges of the main body unit 13 with a hand, and thus can easily grasp a range of set values that can be set.

In addition, a structure may be adopted in which the top of the lower main body unit 22 is inclined in a direction of the vertices of the guide unit 12 and locations on the top corresponding to the vertices of the guide unit 12 are lowest or highest in their surroundings. By this structure, when the user moves the operating knob 11 along the guide unit 12, the user can also feel up and down movement, and can recognize that the lowest point or the highest point corresponds to a set value. Therefore, the user can accurately perform an input operation on the operation input device 100 scale by scale.

Note that although a case is described in which the method of distinguishing the sensors 23 from each other is a method using, as the sensors 23, pressure sensors having different conversion ratios which are used when the sensors 23 convert pressure into current values, the method of distinguishing the sensors 23 from each other is not limited to the method using pressure sensors having different conversion ratios, and a method in which the calculating unit 2 has a plurality of input ports and the sensors 23 are connected to the respective different input ports, may be adopted. For example, when it is configured in such a manner that the calculating unit 2 includes an Arduino having a plurality of input ports, and the sensors 23 convert pressure applied thereto into voltage values, only one sensor 23 is connected to each input port of the Arduino, by which the calculating unit 2 detects to which input port of the Arduino a voltage value has been inputted, and thus the calculating unit 2 can distinguish a sensor 23 having transmitted the voltage value from other sensors 23.

In addition, although a case in which the sensors 23 are pressure sensors is described, the sensors 23 are not limited to pressure sensors, and other sensors, e.g., optical sensors, may be used. When the sensors 23 are optical sensors, the sensors 23 detect that when the operating knob 11 is present on a sensor, light does not enter the sensor, and detect at which location corresponding to a vertex of the guide unit 12 the operating knob 11 is present.

In addition, although a case is described in which, as shown in FIG. 6, the underside of the disc 34 of the operating knob 11 is a flat surface, the underside is not limited to a flat surface and may have a curved surface shape. When the disc 34 has a curved surface shape, friction at a contact portion between the top of the lower main body unit 22 and the disc 34 can be reduced, enabling an advantageous effect that it is easier for the user to move the operating knob 11 to be obtained.

In addition, although a case is described in which, as shown in FIG. 6, the operating knob 11 does not include a movement assisting unit for assisting in movement, it is not limited to the case in which the operating knob 11 does not include a movement assisting unit, and the operating knob 11 may include a movement assisting unit. When the operating knob 11 includes a movement assisting unit, an advantageous effect that it is easier for the user to move the operating knob 11 can be obtained. Note that the movement assisting unit is, for example, a roller disposed on a side of the disc 34 and a guide groove formed in the upper main body unit 21, and by allowing the roller to be movable along the guide groove, movement can be assisted when the user operates the operating knob 11.

Second Embodiment

In the first embodiment, an embodiment is described in which by the sensors 23 arranged at locations, on the top of the lower main body unit 22, corresponding to the vertices of the guide unit 12, a visually impaired person or a worker who operates the operation input device 100 without looking at the operation input device 100 can accurately perform an operation of inputting a set value scale by scale. In a second embodiment, an embodiment will be described in which the operation input device 100 further includes additional sensors, and when the user operates the operating knob 11 along the guide unit 12, it can be recognized whether movement of the operating knob 11 by the operation is movement in a direction in which the set value increases or movement in a direction in which the set value decreases. Note that the configuration of the operation input device 100 and the operation input process performed by the set value input device 100 are the same as those of the first embodiment and thus description thereof is omitted. Note, however, that the second embodiment differs from the first embodiment in that the input unit 1 obtains movement information about a moving direction in which the user has moved the operating knob 11, and transmits the movement information to the calculating unit 2, the calculating unit 2 calculates a moving direction of the operating knob 11 on the basis of the movement information received from the input unit 1, and transmits the calculated moving direction as moving direction information to the output unit 4, and the output unit 4 outputs the moving direction information received from the calculating unit 2 to the user by audio or an image, and that in the memory included in the calculating unit 2 there is stored a corresponding table showing a correspondence relationship between movement information and a moving direction.

Figure 10:
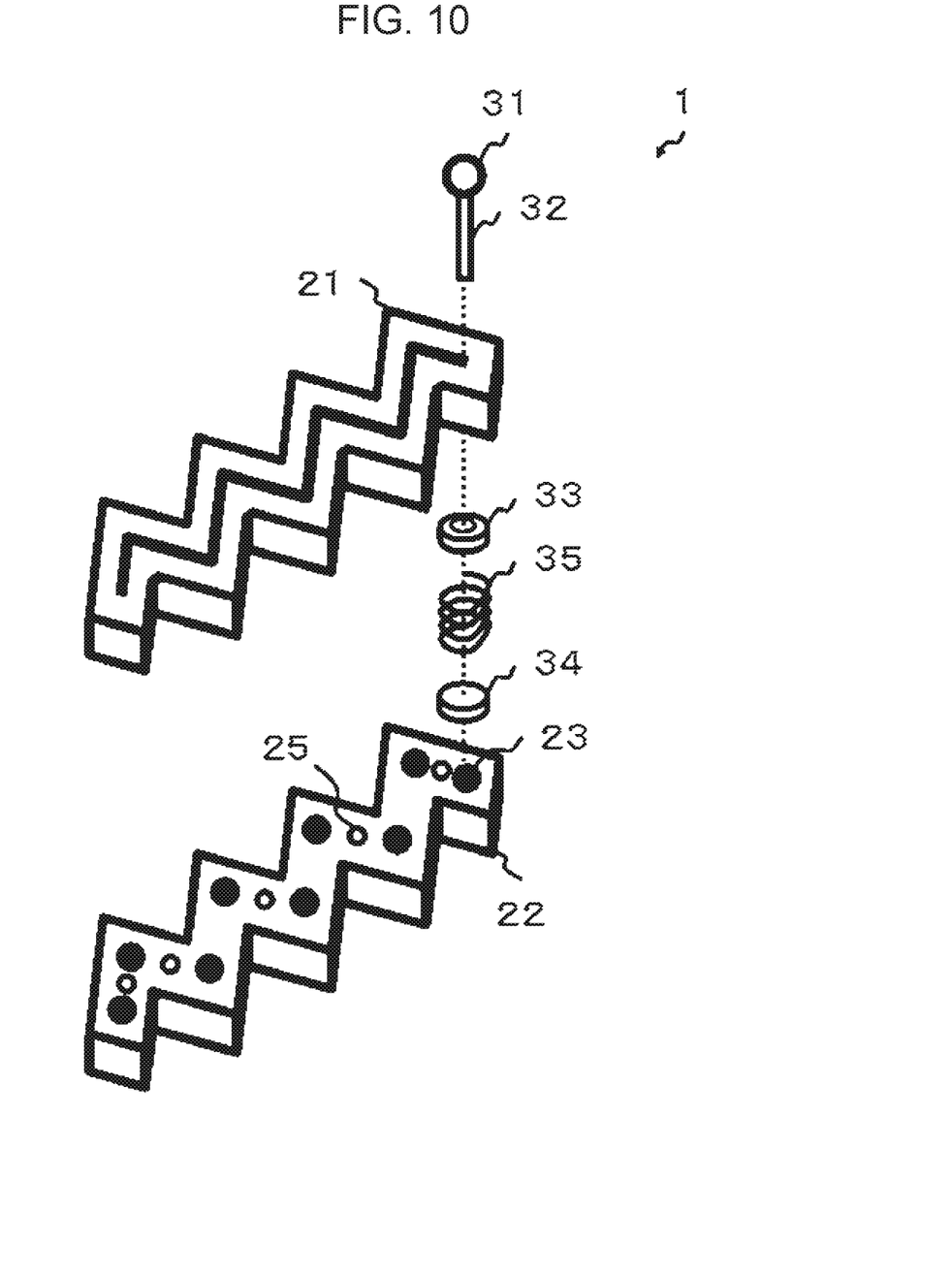
FIG. 10 is an exploded perspective view showing an example of an input unit of an operation input device of a second embodiment of the present invention.

FIG. 10 is an exploded perspective view showing an example of the input unit of the operation input device of the second embodiment of the present invention. Here, FIG. 10 is an exploded perspective view of the operation input device 100 as viewed from obliquely above. Note that the external appearance of the input unit 1 is the same as that of the first embodiment and thus description thereof is omitted.

As shown in FIG. 10, the input unit 1 includes the upper main body unit 21, the lower main body unit 22, the sensors 23, sensors 25, the holding unit 31, the support unit 32, the disc 33, the disc 34, and the spring 35. Here, the sensors 25 are configurations different from the first embodiment, and the upper main body unit 21, the lower main body unit 22, the sensors 23, the holding unit 31, the support unit 32, the disc 33, the disc 34, and the spring 35 are the same as those of FIG. 5 in the first embodiment and thus description thereof is omitted.

One sensor 25 is disposed at a location, between adjacent sensors 23 on the lower main body unit 22, corresponding to the location of a side connecting vertices of the guide unit 12 of the upper main body unit 21, and is a pressure sensor as with the sensors 23, and generates movement information on the basis of a current value into which pressure applied to the sensor when the operating knob 11 is present on the sensor is converted, and transmits the movement information to the calculating unit 2. Here, the calculating unit 2 determines whether the movement of the operating knob 11 is movement in a direction in which the set value increases or movement in a direction in which the set value decreases, on the basis of the received movement information.

Figure 11:
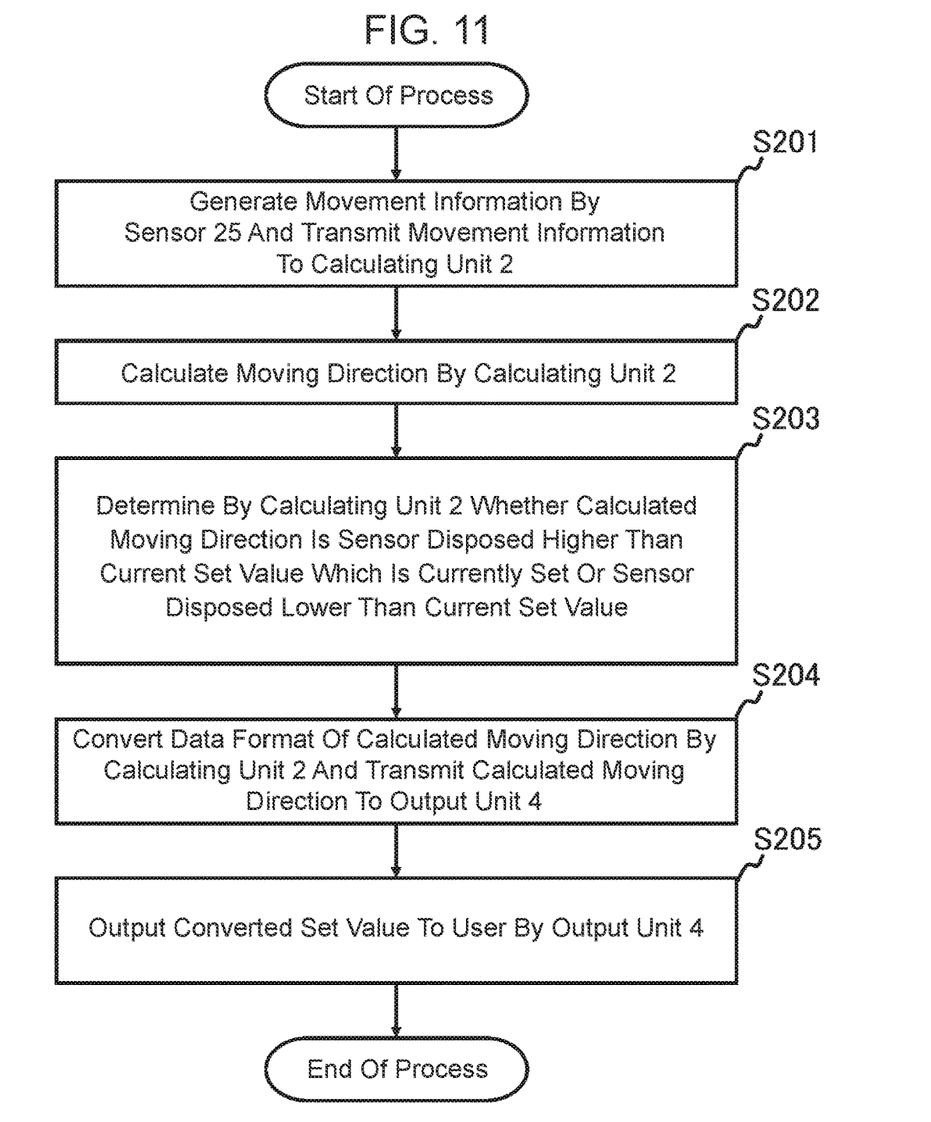
FIG. 11 is a flowchart showing an example of the flow of a movement determination process performed by the operation input device of the second embodiment of the present invention.

Next, the flow of a movement determination process about the operating knob 11 using movement information generated by the sensors 25 of the operation input device 100 will be described using FIG. 11. FIG. 11 is a flowchart showing an example of the flow of a movement determination process performed by the operation input device of the second embodiment of the present invention.

First, by a sensor 25 detecting that there is a change in pressure applied thereto, the processing starts. Specifically, a sensor 25 detects that there is a change in current value into which pressure applied to the sensor is converted, and thereby detects that there is a change in the applied pressure.

At step S201, the sensor 25 generates movement information and transmits the movement information to the calculating unit 2. Specifically, the sensor 25 generates movement information of the operating knob 11 on the basis of a current value into which pressure changed along with movement of the operating knob 11 is converted, and transmits the movement information to the calculating unit 2. Here, for the sake of description, the movement information is the current value itself. Here, the sensors 25 have different conversion ratios which are used when the sensors 25 convert pressure into current values, and even though the same pressure is applied, the pressure is converted into a different current value for each sensor 25. Hence, the sensors 25 can be distinguished from each other by the converted current values. Note that since pressure applied to the sensors 25 changes depending on the method of operating the operating knob 11 by the user, a current value obtained by conversion by the sensor 25 is not always constant. Hence, it is effective to set some margin for threshold values for the current values by which the respective sensors 25 are distinguished from each other.

Next, at step S202, the calculating unit 2 calculates a moving direction. Specifically, the calculating unit 2 calculates a moving direction of the operating knob 11 from the movement information received from the sensor 25. In the memory of the calculating unit 2 there is stored a correspondence table that associates the current values of the sensors 25 which are movement information with moving directions, and the calculating unit 2 calculates a moving direction from the movement information received from the sensor 25, here, the current value, and the correspondence table. Here, the moving direction is information indicating the sensor 25 is disposed higher than which set value and disposed lower than which set value.

At step S203, the calculating unit 2 determines whether the calculated moving direction is a sensor disposed higher than a current set value which is currently set or a sensor disposed lower than the current set value. Specifically, the calculating unit 2 compares the calculated moving direction having been calculated with the current set value stored in the memory, and thereby determines whether the calculated moving direction is a sensor disposed higher than the current set value or a sensor disposed lower than the current set value.

At step S204, the calculating unit 2 converts the data format of the calculated moving direction and transmits the calculated moving direction to the output unit 4. Specifically, when the output unit 4 is a speaker, in the memory of the calculating unit 2 there are stored an audio format conversion table for the speaker and a conversion program, and the calculating unit 2 converts a set value into audio information which is a data format in which the output unit 4 can process, using the conversion table and the conversion program, and transmits the converted audio information to the output unit 4.

At step S205, the output unit 4 outputs the converted set value to the user. For example, when the output unit 4 is a speaker, the audio information is outputted as sound from the speaker. By this process, when the user operates the operating knob 11 along the guide unit 12, the user can recognize whether movement of the operating knob 11 by the operation is movement in a direction in which the set value increases or movement in a direction in which the set value decreases. Note that when the calculating unit 2 converts the calculated moving direction into audio information indicating a notification sound, the calculated moving direction may be converted into different notification sounds depending on whether the calculated moving direction is a sensor disposed higher than the current set value or a sensor disposed lower than the current set value, e.g., in a case of a sensor disposed higher, the calculated moving direction is converted into a notification sound with high key, and in a case of a sensor disposed lower, the calculated moving direction is converted into a notification sound with low key. By this, when the user moves the operating knob 11 along the guide unit 12, the user can more easily recognize, by a notification sound, whether the movement is movement in a direction in which the set value increases or movement in which the set value decreases.

As described above, according to the operation input device 100 of the second embodiment, a sensor 25 is disposed at a location between adjacent sensors 23 on the lower main body unit 22, and a calculated moving direction having been calculated on the basis of sensor information is outputted from the output unit 4 by audio such as a notification sound, by which an advantageous effect can be obtained that when the user operates the operating knob 11 along the guide unit 12, the user can recognize whether movement of the operating knob 11 by the operation is movement in a direction in which the set value increases or movement in a direction in which the set value decreases. By this, the user can reduce an erroneous operation on the operating knob 11.

Note that although a case in which one sensor 25 is disposed between adjacent sensors 23 is described, it is not limited to the case in which one sensor 25 is disposed, and a plurality of sensors 25 may be arranged between adjacent sensors 23. When a plurality of sensors 25 is arranged, when the user operates the operating knob 11 along the guide unit 12, the user can recognize, sensor 25 by sensor 25, whether movement of the operating knob 11 by the operation is movement in a direction in which the set value increases or movement in a direction in which the set value decreases, thereby enabling an advantageous effect that the user can more minutely recognize a moving direction of the operating knob 11 to be obtained. In addition, the calculating unit 2 may change the key of a notification sound for each sensor 25 which is obtained by conversion by the calculating unit 2, on the basis of the distance from a vertex of the guide unit 12. By this, the user can recognize a moving direction of the operating knob 11 in a stepwise manner, and can further reduce an erroneous operation on the operating knob 11.

Third Embodiment

In the first embodiment, the operation input device 100 that enables the user to accurately perform an input operation on the operation input device 100 scale by scale is described. In a third embodiment, an embodiment is described in which the holding unit 31 of the operating knob 11 includes an additional configuration, by which the user can easily grasp the operating knob 11. Note that the configuration of the operation input device 100, the structure of the input unit 1, and the operation input process performed by the operation input device 100 are the same as those of the first embodiment and thus description thereof is omitted.

Figure 12:
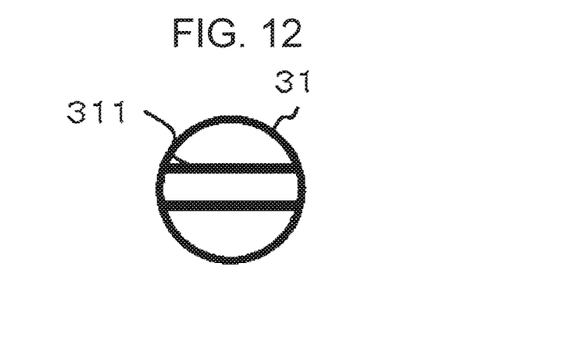
FIG. 12 is a front view showing an example of a holding unit of an operating knob of a third embodiment of the present invention.

FIG. 12 is a front view showing an example of the holding unit of the operating knob of the third embodiment of the present invention. As shown in FIG. 12, the holding unit 31 of the operating knob 11 has a ball shape and includes, on its surface, a recognition assisting unit 311 that includes two recessed portions and assists in recognition. Here, since other components, e.g., the upper main body unit 21, the lower main body unit 22, or the support unit 32, do not include, on their surfaces, recessed portions which correspond to the recognition assisting unit 311, the user can recognize a difference in the sense of touch when touching the recognition assisting unit 311, and can easily tactilely recognize whether a touching component is the holding unit 31 or other components. By this, the user can easily grasp the operating knob 11.

As described above, according to the operation input device 100 of the third embodiment, the holding unit 31 of the operating knob 11 includes the recognition assisting unit 311 that assists in recognition, by which the user can recognize a difference in the sense of touch when touching the recognition assisting unit 311, thereby enabling an advantageous effect that the user can easily grasp the operating knob 11 to be obtained.

Note that although a case in which the holding unit 31 includes two recessed portions on its surface as the recognition assisting unit 311 is described, the recognition assisting unit 311 is not limited to two recessed portions, and a single or three or more recessed portions or other configurations than recessed portions, e.g., projection portions, may be used, and any configuration can be adopted as long as the user can easily recognize a difference in the sense of touch when touching the recognition assisting unit 311.

In addition, although a case in which the holding unit 31 has an additional configuration, i.e., two recessed portions, on its surface is described, the structure is not limited to the one in which an additional configuration is provided on the surface, and a structure may be adopted in which the holding unit 31 is made of a material different than those of other components, e.g., the holding unit 31 is made of metal and other components are made of wood, and any structure can be adopted as long as the user can easily recognize a difference in the sense of touch when touching the holding unit 31.

In addition, although a case in which the holding unit 31 has an additional configuration, i.e., two recessed portions, on its surface is described, the structure is not limited to the one in which an additional configuration is provided on the surface, and a structure may be adopted in which the holding unit 31 is colored in a different color than those of other components, e.g., the holding unit 31 is colored in red and other components are colored in white, and any structure can be adopted as long as the user can easily recognize the holding unit 31 when looking at the holding unit 31 to grasp the holding unit 31. By this, an advantageous effect can be obtained that an even a weak-sighted user can easily recognize the holding unit 31 and other components by looking at them.

REFERENCE SIGNS LIST

1: input unit, 2: calculating unit, 3: setting unit, 4: output unit, 11: operating knob, 12: guide unit, 13: main body unit, 21: upper main body unit, 22: lower main body unit, 23, 25: sensor, 31: holding unit, 311: recognition assisting unit, 32: support unit, 33, 34: disc, 35: spring, and 100: operation input device.

The invention claimed is:

1. An operation input device comprising:
an operating knob to be operated by a user;
a guide unit having vertices and formed in different directions with respect to each of the vertices being base points, the guide unit indicating an operating area for the operating knob;
first sensors each to detect whether the operating knob is present at a corresponding one of the vertices;
at least one second sensor to detect whether the operating knob is present between adjacent two of the vertices of the guide unit;
processing circuitry to calculate a set value on a basis of input information received from each of the first sensors; and
a main body unit in which the guide unit is disposed thereto to form an interior surface of the main body unit that extends along a perimeter of the guide unit, the main body unit having sides on the interior surface with edges at locations corresponding to the vertices of the guide unit, wherein
the processing circuitry calculates a moving direction of the operating knob on a basis of movement information received from the second sensor.

2. The operation input device according to claim 1, the main body unit having a sawtooth-like shape.

3. The operation input device according to claim 1, comprising an output unit to output the set value to the user.

4. The operation input device according to claim 1, wherein
the operating knob includes a holding unit to be grasped by the user, and a support unit supporting the holding unit, and
the holding unit includes a recognition assisting unit to assist in recognition by the user.

5. The operation input device according to claim 4, wherein the recognition assisting unit is a recessed portion or a projection portion.

6. The operation input device according to claim 1, wherein
   the operating knob includes a holding unit to be grasped by the user, and a support unit supporting the holding unit, and
   only the holding unit includes a member made of a different material or a member colored in a different color from other parts of the operating knob.

\* \* \* \* \*